Patented Sept. 3, 1935

2,013,558

UNITED STATES PATENT OFFICE 2,013,558

PUTTING GREEN AND OTHER MATERIALS

John P. Floan, Bayside, N. Y., assignor to Chadeloid Chemical Company, New York, N. Y., a corporation of West Virginia No Drawing. Application November 8, 1930,
Serial No. 494,451

2 Claims. (Cl. 94—7)

This invention relates to improved artificial covering for indoor and outdoor golf courses, miniature golf courses, putting and bowling greens, tennis courts and surfaces on which similar games are played. In some localities these and similar games are played on the same grounds by many people during each day and it is often difficult, if not impossible, to cover the courses with growing grass. In other localities, on account of climatic conditions, it is also difficult to keep such courses, courts or greens, covered with grass. In such places artificial greens are employed. Such artificial greens have been covered by mats composed of hair or fiber, also the ground has been covered with cotton seed hulks dyed to imitate the color of growing grass, and covering composed of feathers mixed with sand and sawdust held together with an oil binder have been used.

One of the objects of the present invention is to produce artificial greens composed of material that will keep the surface in soft and pliable condition, which may be easily repaired and will be free from dust and mud, and which will serve to produce conditions similar to a closely cut turf or sod, and which may be easily and cheaply installed and kept in repair.

As an illustration of the nature of this invention a suitable quantity of hydroscopic substance, such as calcium chloride, magnesium chloride, or similar material may be mixed with wood flour, sawdust or other suitable material, such as lime stone dust from sawed lime stone, brick dust, or similar material, adding enough hydroscopic substance to keep the surface moist and pliable. Ordinary ground and atmospheric moisture will usually keep such material in proper condition due to the existence of conditions of equilibrium as regards moisture content, between the above mixture and the atmosphere. In very hot or dry weather or when used indoors the surface occasionally may be sprinkled with water or other suitable liquid to keep the covering in proper condition. Usually about twenty-five per cent (25%) by volume of the hydroscopic material will be sufficient, but more or less of the hydroscopic substance may be used as may be required under climatic conditions existing in the particular locality where the material is being used. To this material may be added coloring matter to suit requirements, such as green to imitate grass, or terra cotta, or other colors. Such coloring matter may be in the form of pigments or dyes or other substances as may be suitable. Fibrous material, such as vegetable fibres, animal hair, or crushed and cut feathers, may be added to this material in suitable quantity to give added cohesion to the surface material. A thin layer of the prepared material is spread over the surface to be covered and lightly rolled or tramped down.

Illustration two:—

| | Parts by volume |
|---|---|
| Calcium chloride | 25 |
| Wood flour | 25 |
| Lime stone dust | 25 |
| Animal hair | 25 |

Not limited to these.

Illustration three:—

| | |
|---|---|
| Calcium chloride | 35 |
| Wood flour | 35 |
| Lime stone dust | 15 |
| Crushed feathers | 10 |
| Sand | 5 |

Not limited to these proportions.

Illustration four:—

| | |
|---|---|
| Calcium chloride | 50 |
| Wood flour | 30 |
| Fibrous material | 20 |

The invention described in this application is not limited to the exact formulas given as illustrations, the proportions may be varied within considerable ranges so long as sufficient hydroscopic material is used to hold the necessary amount of moisture in the mixture for a reasonable length of time.

Having set forth my invention, I claim:

1. A non-cementitious surfacing composition comprising a mixture of 25 to 50 parts by volume of calcium chloride, 25 to 35 parts by volume of a substance of the class consisting of wood flour, saw dust, lime dust, brick dust, and sand and 10 to 25 parts by volume of fibrous material, the moisture content of the surfacing composition continually changing in accordance with the moisture content of the surrounding atmosphere, and such composition being, when spread out as a layer, soft and pliable.

2. A non-cementitious surfacing composition comprising a mixture of 35 parts by volume of calcium chloride, 35 parts by volume of wood flour, 15 parts by volume of limestone dust, 10 parts by volume of crushed feathers and 5 parts by volume of sand, the moisture content of the surfacing composition continually changing in accordance with the moisture content of the surrounding atmosphere, and such composition being, when spread out as a layer, soft and pliable.

JOHN P. FLOAN.